United States Patent [19]

Spooner et al.

[11] Patent Number: 4,996,031

[45] Date of Patent: Feb. 26, 1991

[54] CATALYST SUPPORT MATERIAL CONTAINING LANTHANIDES

[75] Inventors: James P. Spooner, Willow Grove, Pa.; Alvin B. Stiles, Wilmington, Del.

[73] Assignee: Rhone-Poulenc Inc., Monmouth Junction, N.J.

[21] Appl. No.: 407,931

[22] Filed: Sep. 15, 1989

Related U.S. Application Data

[62] Division of Ser. No. 136,279, Dec. 22, 1987, Pat. No. 4,868,150.

[51] Int. Cl.$^5$ ............................................. B01D 53/36
[52] U.S. Cl. ............................... 423/213.2; 423/213.5
[58] Field of Search ....................... 502/303, 304, 439; 423/213.5, 213.2

[56] References Cited

U.S. PATENT DOCUMENTS

| | | | |
|---|---|---|---|
| 3,867,312 | 2/1975 | Stephens | 423/213.2 |
| 3,966,391 | 6/1976 | Hindin et al. | 423/213.5 |
| 4,228,039 | 10/1980 | Senes et al. | 502/304 |
| 4,906,176 | 3/1990 | Yamashita et al. | 502/303 |

OTHER PUBLICATIONS

Osment, *Active Aluminas as Catalyst Supports for Treatments of Automotive Exhaust Emissions,* International Automotive Engineering Congress, Jan. 1973, pp. 6–9.

*Primary Examiner*—Jeffrey E. Russel
*Attorney, Agent, or Firm*—Burns, Doane, Swecker & Mathis

[57] ABSTRACT

A catalyst undercoat (wash-coat) material comprising a plurality of stable, highly porous, co-precipitated agglomerated microcrystalline comprised of integral admixture of alumina and at least one lanthanide. The co-precipitated material may be converted to a slurry and used as an undercoat or wash-coat atop a prefabricated low surface area support. Alternatively, the co-precipitated material may be compressed or extruded into various geometric forms and these can be used as a support and as such serve both as the support and the undercoat.

20 Claims, 3 Drawing Sheets

CATALYST SUPPORT MATERIAL CONTAINING LANTHANIDES

This application is a divisional of application Ser. No. 07/136,279 filed Dec. 22, 1987, now U.S. Pat. No. 4,868,150.

BACKGROUND OF THE INVENTION

1. Field of the Invention:

The present invention relates to catalytic compositions and methods for their preparation and use. More particularly, this invention relates to a catalyst undercoat material useful for providing an undercoat or alternatively a support having a catalytically advantageous pore size distribution and high porosity.

2. Description of the Prior Art:

There are many types of wash-coats or undercoats (hereinafter referred to as coatings) as well as solid prefabricated catalyst foundations known in the art. It should be noted at the outset that the word support as used in this application applies primarily to low surface area structures which serve as catalyst foundations. To this low surface area support is applied an undercoat or wash-coat having relatively high surface area which serves as an anchor or base for the catalytic entity forming the outermost surface of the catalytic composite. Alternatively, the catalyst undercoat material may be compressed or extruded into various geometric forms and used directly to support a catalyst. Such a solid may be in a variety of forms including powders, granules, sheets, spheres, extrudates, honeycombs or monolith structures, cylinders or rings, saddles, stars and the like. An example of a material serving as both a wash-coat and a high surface area catalyst support is alumina which is used widely as an undercoat and equally widely in the form of spheres, cylinders and extrudates of various configurations as a high surface area support. The undercoat can be thought of as a film of high surface area applied to a low surface area support to attain high catalytic activity not otherwise attainable with low surface area supports.

A variety of high strength low pressure drop catalyst supports are known in the art. These supports characteristically have a smooth surface and are catalytically inert, non-porous and have a low surface area.

Before a catalyst can be applied to the surface of the support material a film or layer of high surface area material must first be applied. Such multi-layer catalysts are frequently used in the chemical industry or in abatement processes for the disposal of combustible or toxic materials including reducing pollutants in waste gases. For example, these catalysts may be used for the oxidation of carbonaceous materials as well as the reduction of nitrogen oxides contained in automobile exhaust.

The current art can be illustrated by the typical catalytic composite comprising a sturdy foundation illustrated by a low surface area honeycomb or similar monolithic support. Because this foundation material typically has a smooth surface and is dense and non-porous, a film or coating of a strongly adherent, refractory, high surface area and porous nature is applied. It is to this coating that our invention is directed and will subsequently be fully described. Finally onto and into this film is applied by impregnation, immersion, spraying or other means the catalytic coating comprising oxidation catalysts from the precious or base metal groups.

Examples of such prior art catalytic composites include those disclosed in U.S. Pat. No. 3,993,572 wherein the catalyst component contains a platinum group metal, a rare earth metal and an alumina component. The rare earth metal oxides disclosed include cerium, samarium and praseodymium. The catalyst component may be prepared by co-precipitating the ingredients. Such co-precipitation is described as either surface absorption or precipitation of a liquid or solid. The impregnation of alumina powder with cerium salts is also disclosed.

U.S. Pat. No. 3,867,309 relates to the deposition of palladium and a metal selected from the group consisting of a rare earth, iron, manganese and zinc to high surface area gamma alumina spheres. An example of a rare earth or lanthanide is cerium nitrate. Similarly U.S. Pat. No. 3,903,020 describes the impregnation of cerium onto and into already formed alumina particles, generally in the form of spheres. The cerium salt is preferably cerium nitrate. After applying the cerium nitrate to the surface of the spheres, the entire composite is then calcined to decompose the lanthanide nitrate and introduce the interspersed oxide as a stabilizing agent into the alumina.

U.S. Pat. Nos. 3,867,312 and 3,899,444 disclose another procedure which includes preparing an aqueous solution of water soluble decomposable salts of a rare earth metal and a water soluble aluminum salt, evaporating the free water from the solution and then heating the resultant mixture of aluminum salt and rare earth metal salt. A uniform mixture of salts is obtained and subsequently decomposed to relatively low surface area oxides. The mixed oxides are cooled and a support material is thus produced. This procedure and slight variations have found wide application because the decomposition of the nitrate has the desirable result of producing a comparatively adhesive oxide or mixed oxide. However, the activity of such oxides is very poor because the decomposition procedure results in an oxide which as noted above is both dense and low in surface area. Further, these patents are primarily concerned with the adhesion of the film and only to a lesser extent, the other physical characteristics. U.S. Pat. No. 3,867,312 refers to the formation of a gel from the precipitation of lanthanum and aluminum hydroxide which gel is then processed into spheres. These spheres become the support material for the catalytic coating. No reference is made to the use of this product as an adhesive film.

While most of the activity in the design of chemical reactions or of catalytic abatement processes relates to the development of catalysts, it has become increasingly apparent that the catalytic support material is itself an important factor in the overall design of the catalyst and the operating facilities. The catalyst and catalyst bed must be prepared in such a manner as to minimize pressure drop. The current designers have recognized that in order to obtain maximum catalyst performance, the catalyst support or catalyst support surface must be among other things rugged and of such a design that the gases or liquids to be reacted will pass through and contact the catalyst deposited on the surface of the catalyst support material without allowing a substantial pressure drop.

Not only is it necessary that the contact be intimate, but it is also essential that the catalyst that is applied to the catalyst support has a high inherent activity, even when the catalyst is present as a thin film on the nonporous surface of a rugged support. This requirement translates into a catalytic film having a specific chemical composition with a catalytically advantageous pore size distribution, high stability, high porosity and firm adherence to the smooth surface low pressure drop support.

Thus, while the art has generally recognized the use of a lanthanide for the stabilization of alumina, there remains a need for highly stable catalytic support compositions with novel control of total pore volume, pore distribution and thermal stability assuring retention of these characteristics.

The above cited patents are generally representative of the state of the art. From these teachings, it becomes readily apparent that in general a water soluble lanthanide salt or salts are added to some form of particulate alumina which is later further processed and ultimately applied as a coating or made into a support in the form of spheres, cylinders, extruded rods and the like. In such preparations, the intimate mixture, high porosity and reproducible physical characteristics taught by the present invention are completely missed because either the particulate alumina or lanthanide defeats the need for co-precipitation herein taught. For example, it is impossible to derive an intimate or integral mixture in unit crystal to unit crystal relationships by the teachings of the prior art because the crystals in the particulate portion are massive relative to the truly co-precipitated materials formed by the practice of the instant invention.

SUMMARY OF THE INVENTION

It is thus a major objective of the present invention to provide a highly stable catalyst support material comprising a plurality of stable, highly porous co-precipitated microcrystalline particulates comprised of integral admixture of alumina and at least one lanthanide. The catalyst support material may be applied as a slurry to a prefabricated support, thus serving as a wash-coat/undercoat, or alternatively, the catalyst support material may be directly used to produce a support.

It is another object of the present invention to provide a microcrystalline or crystallite catalyst support material that is co-precipitated from soluble salts of alumina and at least one lanthanide.

Additionally, it is an object of the present invention to provide a catalyst support material which may have associated therewith a base metal oxide which is from Group 1B, 3B, 4B, 6B, 7B or 8 of the Periodic Table.

It is a further object of the present invention to prepare a catalyst support material which is useful to oxidize gases, in particular, carbon monoxide and hydrocarbons in automotive exhaust gases.

A still further object of the present invention is a process for preparing a catalyst support material which has a plurality of stable, highly porous, co-precipitated microcrystalline particulates comprised of an integral admixture of alumina and at least one lanthanide.

A description of the requirements and basic fabrication techniques for a catalyst to be used in this service is now presented. Because the exhaust from an automotive engine is at very high velocity, the permissible space velocity and the design of the catalyst for this permissible velocity is consequently very high. The requirements for the design of the catalyst are such that it must take into account the very high space velocity and short contact time. Furthermore, the pressure drop must be low because the exhaust back pressure from the engine must be as low as possible because any back pressure from the catalyst bed would tend to decrease very substantially the efficiency of the engine. These considerations are important not only for the automotive exhaust abatement systems but also for all abatement systems which are designed for use in low pressure drop operations. This includes exhaust from essentially all types of ventilating systems and as well as boilers and flue gas from such steam generating stations for electric and steam generating requirements.

THE SUPPORT

The first basic requirement for the support material for the catalytic composite is for high rigidity and high strength. This generally means a dense, honeycomb type structure with thin, non-porous, almost glassy surfaces. This can be fabricated from many different types of compositions with cordierite being most frequently used in the automotive industry. For other systems there can be metallic, ceramic resembling porcelain, mullite, and the like. Industrial researchers report that they can make these structures from almost any type of composition. However, for maximum strength, cordierite appears to have the best overall properties of any existing material. It has an almost glassy and very dense surface.

The support material just described is catalytically essentially inert. However, because many of the catalysts which are supported on it are used at extremely high temperatures, the support material may be chemically quite reactive at these higher temperatures. This may cause harmful solid state reactions between the support and the previously described wash-coat. Not only can there be a reaction between the support and the wash-coat or undercoat, but in severe conditions the catalytic final coating and the ingredients in the support material may migrate completely through the wash-coat and damage the final coating which is the active catalyst. It becomes apparent that the ingredients in the support and the underlayer must be designed to avoid those solid state reactions to the extent which they can damage the catalyst coating.

THE UNDERLAYER

The underlayer is an important component in the catalyst composite. It must have characteristics which make it possible for it to adhere tightly to the glassy surface of the support material but simultaneously have a high surface area and high porosity for the retention and active dispersion of the third and final component of the catalytic composite which is the catalytic agent itself. It must also prevent solid state reaction between the support and the catalytic coating and not react harmfully with the catalytic coating. It is to this underlayer that the present invention is directed. For this underlayer to function as completely as possible for its intended use, it must not only have the characteristics already enumerated but because the catalyst may be used at a high temperature it must also have thermal resistance. Because the catalyst must be used at very high space velocity, it must also have well-defined and thermally stable specified pore distribution and total pore volume. In most cases the catalyst composite will not only be used in very high space velocity but also at low pressures which means that the diffusion of the gases and adsorption of the reactants into and onto the pores and reactive surfaces must be achieved very rapidly. This requires that the pore distribution be such that there are optimum quantities of large pores for easy diffusion and mass transport but also there must be an optimum quantity of small diameter pores where most of the catalytic activity and surface adsorption takes place. It is this that has been attained by the specific composition and process of the present invention. In addition to achieving the desired pore distribution in a bi- or tri-modal regime, it has been discovered that powder having the above-enumerated desirable characteristics can be made to adhere very strongly by further processing the powder and generating a slurry of paint-like character incorporating colloidal oxides. It is believed that this colloidal material also introduces highly desirable large pores by properly selecting the particle size of the component or components of the colloid. Attractive catalytic characteristics can also be added to the undercoat by selecting the ingredients of the colloid, ceria and other lanthanide oxides being excellent examples.

THE CATALYTIC COMPONENTS

The catalytic composite which consists of the support and the undercoating is fully achieved by adding the third component which is the catalytic ingredient. These catalytic ingredients are well known in the art. Useful for this surface catalytic coating are precious metals, particularly platinum, palladium, and rhodium, and certain base oxides which are identified in the Periodic Table of the elements in certain groups. The groups are usually identified as group 8 which includes the precious metals and individual elements such as manganese, chromium, and copper as their oxides or interreaction products. These may be stabilized by incorporating high melting point refractories which include alumina, silica, magnesium oxide, calcium oxide, strontium and barium oxides. A better understanding of the relationship between the support, the undercoat, and the catalytic overcoat can be obtained by reference to FIG. 4 which shows in enlarged detail the central component being the support (A), a thin film being the underlayer (B), and a thin overcoat which is the catalytic component (C). The catalytic component not only can be a distinct overcoat but in some cases can penetrate into the undercoat layer itself and become a dispersed material through the undercoat. FIG. 3 is the full-size support and FIG. 5 is an isometric sectional view of one bridge or support of FIG. 4. Other supports such as spheres, pellets, rods, saddles, rings and the like are well known in the art.

DETAILED DESCRIPTION OF THE PREFERRED EMBODIMENT OF THE INVENTION

Figure 1:
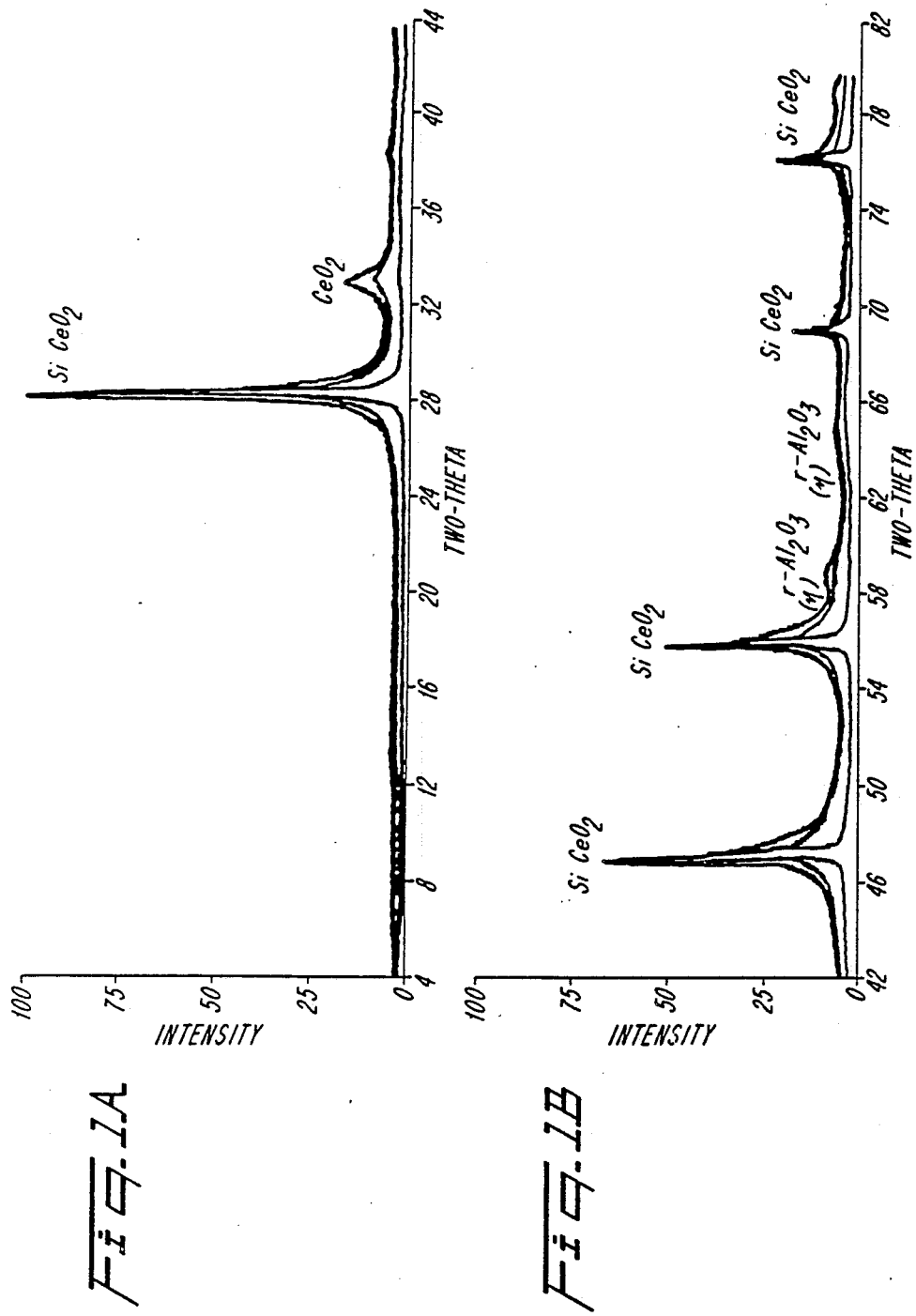
FIGS. 1A and 1B are an x-ray pattern at 350° C. without aging (2 theta is 4° to 80°) which shows the crystal peaks of ceria and alumina at a ratio of 10%Ce/90%Al, 20%Ce/80%Al and 30%Ce/70%Al.

The present invention concerns a catalyst support material comprising alumina and at least one lanthanide oxide which are co-precipitated from soluble salts and which form a microcrystalline, highly stable integral mixture having high porosity and specific bi-modal or tri-modal pore distribution.

The product of the present invention is a microcrystalline co-precipitate. The formation of this fine microcrystalline agglomeration of crystallites is essential when deriving the desirable controlled porosity of the present invention. The conglomerate of the present invention is also particularly stable, for example, the pores do not collapse at high temperatures and the advantageous surface area, pore volume and distribution are retained.

The lanthanide series metal is present along with the alumina in the catalyst support material of the present invention as an oxide. Metals in the lanthanide series include elements having an atomic number from 57 through 71, comprising lanthanum, cerium, praseodymium, neodymium, promethium, samarium, gadolinium, terbium, dysprosium, holmium, erbium, thulium, ytterbium and lutetium; preferred are cerium, lanthanum, praseodymium and neodymium. Mixtures of all or part of these, available commercially as their salts, may also be advantageously employed. The lanthanide series elements are most likely to be present in the finally prepared undercoat in the form of an oxide, peroxide or suboxide.

In the case of automotive exhaust gases, the primary reactions are the oxidation of combustibles to carbon dioxide and water and the reduction of $NO_x$ to elemental $N_2$. These reactions generally occur at elevated temperatures, generally in the range of about 100° C. to about 1300° C., preferably about 100° C. to about 1000° C. but a temperature range of about 300° C. to about 400° C. is more common.

The amount of alumina in the catalyst undercoat material may range from about 1 to about 75 weight percent based on the total solids content thereof. The lanthanide oxide may be present in an amount of from about 1 to about 45 weight percent based on the total weight of the ceria and alumina therein. Preferably, from about 15 to about 35 percent by weight of lanthanide is used to stabilize the alumina. A catalyst support material comprised of about 80% alumina and 20% lanthanide is preferred.

The catalyst undercoat material of the present invention is precipitated from water-soluble salts of aluminum and a lanthanide. Suitable water-soluble salts of aluminum include aluminum nitrate, aluminum sulfate, aluminum chloride, aluminum acetate, aluminum oxalate and the like. Aluminum nitrate is preferred.

Suitable water-soluble lanthanide salts include cerium nitrate, lanthanum nitrate, praseodymium nitrate, neodymium nitrate, cerium sulfate, cerium chloride, lanthanum acetate, lanthanum sulfate, cerium acetate, cerium lactate, cerium propionate, cerium butyrate and the like. The lanthanide nitrates are preferred since some of the other anions may unfortunately appear as an occluded ion in the precipitate. For instance, sulfate has a tendency to be occluded and to poison the catalyst probably as the non-catalytic sulfate or sulfide.

The soluble salts of aluminum and lanthanides are preferably of high purity. Each of the soluble salts may be prepared by processes well-known in the art. For instance, aluminum nitrate may be prepared by dissolving pure aluminum metal in dilute nitric acid also of high purity. Aluminum metal equivalent may represent about 1 to about 50 weight percent, preferably about 1 to about 30 weight percent of the entire composition during preparation of the soluble salt.

The total concentration of salts in the aqueous solution prior to co-precipitation generally ranges from about 0.5 to about 1.5 molar, preferably about one molar. The total solids content of the aqueous solution may be from about 1 to about 20 weight percent, preferably, about 5 to about 10 weight percent. A very broad temperature range is suitable in the preparation of the aqueous solution. A temperature range of about 15° C. to about 50° C. is generally used, with 25° C. to 35° C. being preferred.

The co-precipitation of the catalyst undercoat is preferably conducted using known precipitants. Such precipitants include but are not limited to ammonium carbonate, ammonium bicarbonate, gaseous ammonia accompanied by carbon dioxide and the like. Carbonates, bicarbonates and hydroxides of sodium, potassium or other suitable alkalis may also be used. The ammonium carbonates, however, are preferred since resultant ammonium nitrate is easily decomposed and leaves the precipitate during calcining whereas the Na, K, Rb or Cs ions are apt to be occluded and be harmful.

The co-precipitation may be conducted over a temperature range of about 15° C. to about 50° C., however, a temperature of about 25° C. to about 35° C. is preferred. It is important to control the final pH of the co-precipitation. The final pH of the co-precipitation may be in the range of about 6.0 to about 8.0, more preferably, about 6.7 to 6.9.

The precipitated mixture is washed by decantation if feasible, and/or alternatively, filtered, suspended and rewashed and then filtered, dried and calcined. It may at times be advantageous to leave some of the dried precipitate uncalcined and to mix it with the calcined material prior to the undercoat being applied to the support. On calcining this uncalcined material decomposes providing still more porosity to the coating.

After calcining, if the precipitate has been precipitated with a cation other than ammonium and it is occluded in the calcined precipitate then the alkali e.g., sodium, may be removed by ion exchange. The calcined precipitate should be washed repeatedly by decantation in an aqueous ammonium carbonate or bicarbonate solution at approximately 0.1% to 2% concentration until the offending ion is reduced to an acceptable level. This is generally achieved when only approximately 50 ppm of ion remains in the precipitate. This is done because alkali adversely affects the physical and thermal stability of the precipitate.

The precipitated catalyst undercoat of the present invention does not generally readily adhere to the support. It has been found that the addition of a film forming material, for example a colloidal lanthanide, and most preferably colloidal ceria, improves the adhesion characteristics of the undercoat to the support. Film forming materials, especially colloidal lanthanide, are available in commerce. The quantity of colloidal lanthanide required to generate the adhesive properties used is generally from about 2% to about 40%, preferably about 3% to about 25% of the total weight of the solids or precipitate. The use of such a colloidal lanthanide is also advantageous because it beneficially affects the activity of the catalyst overlayer. A further benefit derived from the use of colloidal lanthanide is that the larger colloidal particle introduces a still further modification of pore distribution of the composite.

In another embodiment, the slurry of catalyst undercoat and film-forming colloid, after milling, can be simply dried to a cake which can be crushed and screened for use as granules. Additionally, the slurry can be dewatered to a paste which can be extruded into appropriate pellets, bars, rods, rings and the like. These structures can be used as such without the foundation support as a satisfactory support for the catalytic overlayer.

The pore size of the catalyst underlayer of the present invention is unique and important. The pore size of the catalyst should be large enough to accommodate the eventual catalyst coating and permit the mass transport of the reactants into and out of the pores to allow facile adsorption and reaction in the small functional pores. There are three specific predominate pore size diameters with the first of those being below about 100 Angstroms, the second being about 200 to 400 Angstroms and the third being greater than about 400 Angstroms. If a plot of pore size versus number of pores indicates a peak in two of those categories, then the pore distribution is bi-modal. If on the other hand, three peaks, one in each category is obtained, then the pore distribution is considered to be tri-modal. Preferably approximately 50 to 60% of the total pore volume is less than 200 Angstroms, approximately 20 to 30% of the total pore volume is in the 200 to 400 Angstrom range and approximately 10 to 30% is greater than 400 Angstroms. This quantity of large pores provides facile mass transport to the reaction site whereas the large fraction of small pores provides an abundance of reaction sites. This bi-modal character is considered to be particularly effective for automotive emission catalysts.

The surface area of the catalyst underlayer of the present invention is preferably greater than $50m^2/g$ after treatment at 1000° C. The average pore volume is preferably in the range of about 0.15 cc/g to about 0.5 cc/g.

When a support is used, the catalyst support material of the present invention is generally a major amount of the total catalyst structure, typically about 50 to about 80 weight percent, preferably about 50 to about 65 weight percent, based on the total weight of the catalyst, underlayer and support. The amount used depends on economics, size limitations and design characteristics.

These unitary supports are characterized by having a plurality of flow channels or paths extending therethrough in the general direction of gas flow. During use for oxidation of carbonaceous fuels, the catalyst is typically placed in a vessel so that its structure completely occupies the cross-sectional area of the vessel. Advantageously, the structure has the general shape of the reaction vessel for which it is designed; and when prepared, the catalyst supported on such a structure can be placed therein with the channels extending in the general direction of gas flow between an inlet and outlet.

These supports whether of the unitary-skeletal type or pellets are preferably constructed of a substantially chemically and relatively catalytically-inert, rigid material capable of maintaining its shape and strength at high temperatures, for example, up to about 1300° C. The support typically has a low thermal coefficient of expansion, good thermal shock resistance, and low thermal conductivity. While a support having a porous surface is preferred, the surface may be relatively nonporous; but in such event it is desirable to roughen the surface to improve adhesion of deposited compositions.

The geometric, superficial or apparent surface area of the skeletal type support including the walls of the gas flow channels is generally about 0.5 to 6, and preferably 1 to 5 square meters per liter of support. This surface area is sufficient for deposition of a satisfactory quantity of the catalyst undercoat of the present invention. The plurality of channels, about 100 to 2500, preferably 150 to 500 per square inch of cross-sectional area, may be distributed across the entire face of the structure and frequently they define an open area in excess of 60% of the total area of the support. The channels generally extend through the support and are preferably separated by thin walls. The walls must be thick enough to provide rigidity and integrity to the structure while maintaining good available or active catalyst area. The wall thickness is thus in the range of about 2 to 25 mils. The flow channels can be of any shape and size consistent with the desired superficial surface area and should be large enough to permit relatively free passage of the gaseous mixture undergoing reaction.

In order to further illustrate the present invention and the advantages thereof, the following specific examples are given, it being understood that same are intended only as illustrative and in nowise limiting.

EXAMPLE 1

Preparation of Undercoat Containing Alumina and Cerium

A series of precipitations was made to incorporate various ratios of aluminum oxide and cerium oxide in the range of 0% cerium oxide and 100% aluminum oxide to 100% cerium oxide and 0% aluminum oxide. The ratios tested were 95/5, 90/10, 80/20, 65/35, 50/50, 35/65, 20/80, 10/90, 5/95, and 0/100% respectively. Undercoat of these ratios were all made by co-precipitation of the respective carbonates from the water soluble nitrates. The solutions were prepared in such a way so that they were about 1.0 molar or less with respect to the combined concentration of the nitrates. All precipitations were conducted at about 35° C. using ammonium bicarbonate solution as the precipitant. Supplemental carbon dioxide was also added to the reaction mixture and to the slurry during the subsequent digestion.

The temperature of precipitation was 35° C. in order to minimize the decomposition of the carbonate. The carbonate is generally unstable at temperatures above 30° C. The supplemental carbon dioxide was added to maintain the carbonate at as high of a ratio as possible. When the carbonate decomposes, there is a tendency for hydroxide formation which could produce a less active undercoat upon calcining.

A step by step account of the precipitation and final preparation of the undercoat containing 100% aluminum oxide and 0% lanthanide oxide is as follows:

1. A solution was prepared at a 1.0 molar level in which about 349 gm of aluminum nitrate nonahydrate was dissolved in water to make 1 liter of solution. Greater quantities or volumes can be made by proportionally increasing the aluminum nitrate and the water solution levels.

2. Separately a 20% solution of ammonium bicarbonate was prepared by dissolving the ammonium bicarbonate in sufficient distilled water to attain a 20% solution which is close to the saturation level.

3. The aluminum nitrate solution was heated to 35° C. and was rapidly agitated.

4. The ammonium bicarbonate solution also at 35° C. was added to the aluminum nitrate solution at such a rate that approximately 1 hour was required for it to reach a pH of 6.9±0.1 pH.

5. The ammonium bicarbonate addition was stopped once a pH of 6.9 was achieved, however, the carbon dioxide was continued to be sparged through the slurry for a period of 1 hour. The temperature was maintained at 35° C. during this period.

6. After the period of digestion, the aluminum hydroxide was filtered and washed on the filter with sufficient distilled water to be equal to the original volume of the slurry. Filtration was generally slow but it could be improved by recycling some aluminum oxide, which was processed through the drying and calcining stages. This previously processed product acts as a filter aid in the operation.

7. After filtration the aluminum hydroxide was dried at 150° C. and calcined at 350° C. for approximately 3 hours. This was the precipitated aluminum oxide used for comparison in the Examples.

As noted earlier, the forgoing describes a method for the precipitation of alumina alone. However, the same procedure is used in producing undercoats containing alumina and lanthanide oxide.

This example also involves the preparation of an undercoat comprising 80% aluminum oxide and 20% cerium oxide. 349gm of aluminum nitrate (nonahydrate) and 30gm of cerium nitrate hexahydrate both dissolved in a liter of solution to form a 1 molar solution. This solution was then processed the same as the procedure previously described in steps 2 through 7 above. The resulting co-precipitated cerium oxide-aluminum oxide undercoat was subjected to a number of tests. The undercoat was heated to 1000° C. and thereafter physical measurements were made for X-ray species identification, crystallite size determination and pore size distribution. The catalytic stability and the undercoat's ability to function as a foundation for catalytic activity was tested by formation of a granular composition on which a small amount of palladium catalyst was coated.

FIG. 1 is an x-ray pattern of the undercoat of the present invention using 10%Ce/90%Al, 20%Ce/80%Al and 30%Ce/70%Al at 350° C. without aging.

Figure 2:
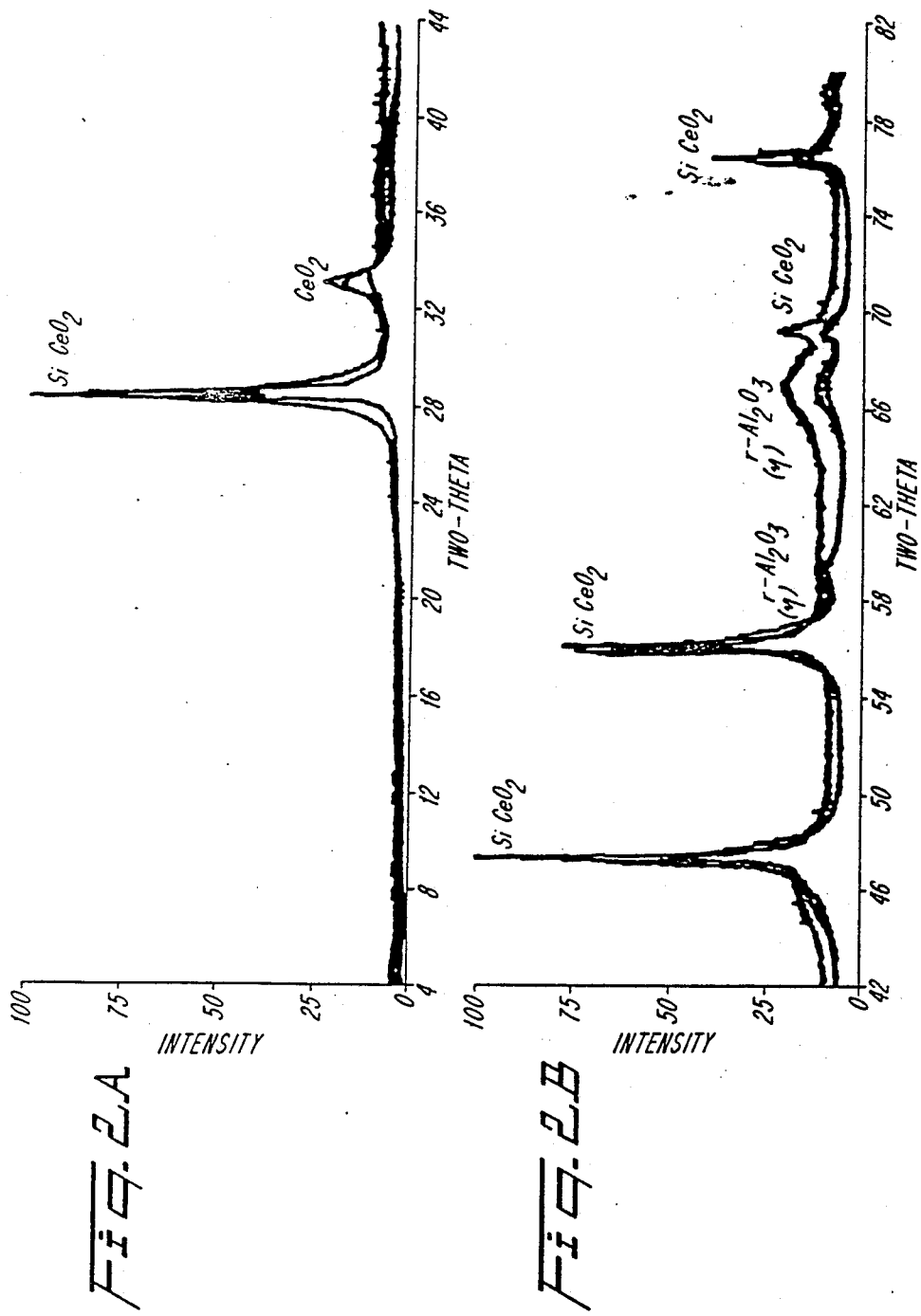
FIGS. 2A and 2B are an x-ray pattern at 800° C. without aging (2 theta is 4° to 80°) which shows the crystal peaks of ceria and alumina at a ratio of 10%Ce/90%Al, 20%Ce/80%Al and 30%Ce/70%Al.
Figure 3:
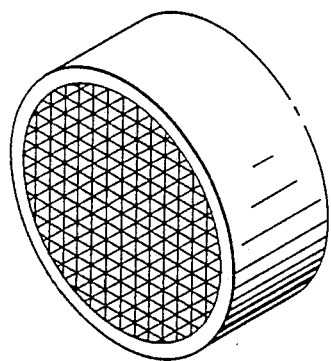
FIG. 3 is a form of a catalyst support having both an undercoat and a catalytic coating.
Figure 5:
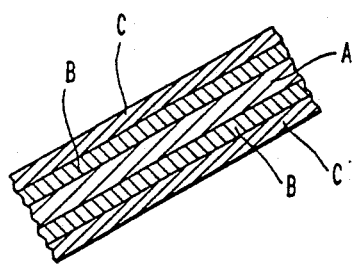
FIG. 5 is an isometric projection at a 45° angle of one of the bridges or supports of FIG. 4.
Figure 4:
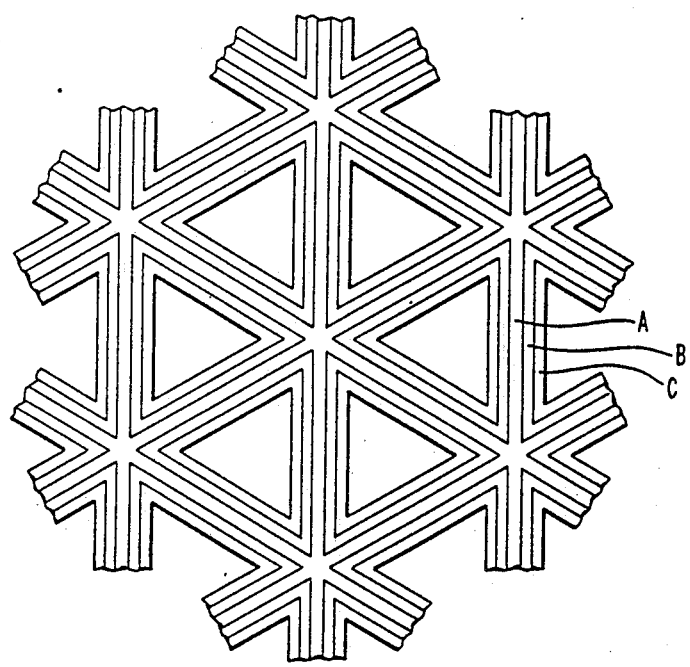
FIG. 4 is a cross-sectional view showing in enlarged detail the relationship between the support (A), the undercoat (B) and the catalytic overcoat (C) of FIG. 3.

FIG. 2 is an x-ray pattern of the undercoat of the present invention using 10%Ce/90%Al, 20%Ce/80%Al and 30%Ce/70%Al at 800° C. without aging. In this figure, 20%Ce/80%Al demonstrates the least surface area loss. The ceria tends to stabilize the alumina from crystallite growth. The alumina and ceria remain as finely dispersed crystallites or distinct microcrystalline particles.

The undercoat was also processed and tested by milling the undercoat prepared above with colloidal ceria or another colloidal lanthanide material and then applied as a film to the typical honeycomb or monoliths used in automotive and other exhaust fume abatement systems. After being placed as a film on the honeycomb, the undercoat was impregnated with a small amount of a precious metal specifically 50 ppm of palladium based on the entire weight of the honeycomb (approximately 200 ppm based on the weight of the film material itself).

The coated and impregnated monoliths were then tested in a number of gas streams to determine their effectiveness for abatement of noxious gases typically present in both industrial and automotive exhaust streams.

Test data for the preparations in this Example are recorded in Table I.

EXAMPLE 2

Preparation of Undercoat Containing Alumina and Praseodymium

The precipitation was made in accordance with Example 1, except that praseodymium nitrate was used on the same molar and weight basis as the cerium nitrate of Example 1. Test results for this example are essentially the same as for the results for the 20/80 co-precipitate of Example 1. The results are recorded in Table I.

EXAMPLE 3

Preparation of Undercoat Containing Alumina and Neodymium

This preparation was identical to that described in Example 1, with the exception that instead of using cerium nitrate, neodymium nitrate was used on the same molar and weight ratio basis. Test results were very similar to those given for Example 1 as recorded in Table I.

EXAMPLE 4

Preparation of Undercoat Containing Alumina and Lanthanum

This precipitation was identical to that of Example 1 with the exception that lanthanum nitrate was used instead of the cerium nitrate on the same molar and weight ratio basis. Test results were very similar to those given for Example 1 as recorded in Table I.

EXAMPLE 5

Preparation of Undercoat Containing Alumina and Mixed Lanthanides

This preparation was also identical to that of Example 1 with the exception that instead of using cerium nitrate, a mixture of lanthanide nitrates was used. This lanthanide salt mixture will vary with the type of ore being processed by the processing company. The ore used in this example contained approximately 50% cerium, approximately 25% lanthanum, approximately 20% neodymium and approximately 5% praseodymium. It also may vary for commercial or marketing reasons where certain lanthanides may be removed and purified. Thus, the mixture remaining would be devoid of one or more of the normal constituents from the ore.

Usually these preparations with mixtures of lanthanides are more or less a "shotgun" method of deriving information on the efficacy of individual lanthanides. After the mixture has been evaluated and found to be effective, individual members in the ore are usually isolated and evaluated to determine the preferred elements. Test results for this mixture are very similar to those of Example 1. The results are recorded in Table 1.

COMPARATIVE EXAMPLE 6

The preparation of the catalyst of this example is typical to that which is currently used in the automotive exhaust abatement industry. This is the standard material used today and is the baseline for comparison with the present invention. This process involves slurrying sufficient cerium hydroxide and aluminum hydrate or oxide having high-surface area and high purity in water. This method is concerned with the addition of pre-formed, pre-precipitated cerium to preformed, pre-precipitated alumina. Sometimes the alumina is obtained by the hydrolysis of the aluminum alkalies that are intermediates in the synthesis of long straight chain alcohols. Aluminum hydroxide is a by-product of this hydrolysis. A sufficient amount of these basic ingredients was used to eventually obtain 20% cerium oxide and 80% aluminum oxide. The aluminum hydroxide and cerium hydroxide were placed in a ball mill together with sufficient distilled water so that it could be milled using ceramic balls. Ball milling was continued for approximately 12 hours, and at this time an impalpable slurry of solids in an aqueous dispersion was obtained. This was transferred to a glass beaker and sufficient 70% nitric acid was added to dissolve 10% of each of the ingredients. This slurry was then rapidly agitated and heated to 35° C. Approximately 20% ammonium bicarbonate solution also at 35° C. was immediately added until a pH of 6.9±0.1 was attained. The remaining processes of filtering, drying and calcining were effected as described in Example 1. Available test results are given in Table I. The undercoat of the present invention had greater porosity and higher thermal stability than the prior art catalyst.

COMPARATIVE EXAMPLE 7

The same procedure was followed as presented in Example 6 above except that the cerium was added as a milled hydrate and the aluminum was added totally as water soluble aluminum nitrate. Thus, the cerium was in the form of the commercial cerium product and the aluminum was prepared differently. This preparation was processed in a similar manner to the preceding example. The precipitation was effected with ammonium bicarbonate and the end point was also 6.9±0.1pH. Filtration, washing, drying and calcining were conducted as described in Example 6. This product was tested and characterized and the data is summarized in Table I. The cerium hydrate product was not as good as the catalyst material of the present invention.

COMPARATIVE EXAMPLE 8

The procedure in this example was very similar to that used in Example 7 except that the ceria was added as the cerium nitrate and the aluminum oxide was derived from the water insoluble alumina hydrate. Thus, the alumina was in the form of the commercial alumina product and the cerium was prepared differently. Once again a 20% cerium oxide and 80% aluminum oxide was produced in the final stage. A milled slurry was prepared and the milled product was an extremely finely ground slurry as was called for in the preceding examples. The slurring, heating and precipitation to a pH of 6.9±0.1, washing, drying, calcining, and evaluation were all conducted in a manner similar to that used in the previous examples with the activity and physical data also summarized in Table I. This product, is also similar to some products produced by commercial producers of automotive fume abatement catalysts. Available data are given in Table I. Poor results were obtained using this catalyst support material as was the case with Examples 6 and 7.

EXAMPLE 9

Preparation of a Undercoat Containing Alumina and Cerium

A solution was prepared as described in Example 1 to obtain a composition of 20% cerium oxide and 80% aluminum oxide on a weight basis in the undercoat. Approximately 30 grams of cerium nitrate hexahydrate and 349 grams aluminum nitrate (nonahydrate) were dissolved in sufficient distilled water to equal a volume of one liter.

Separately a 20% solution of ammonium bicarbonate was prepared and was rapidly agitated. The temperature was adjusted to 30° C. A flow of carbon dioxide as finely divided bubbles was continuously added to the carbonate solution during the subsequent precipitation and digestion.

In contrast to the foregoing examples, the aluminum and cerium nitrate solution was added to the rapidly agitated ammonium bicarbonate solution until a pH of 7.0±0.2 was reached. Agitation and carbon dioxide addition was continued for an additional hour following the completion of precipitation. The slurry was filtered, washed on the filter, the filter cake was dried and calcined as described in Example 1. The calcined powder was further processed into catalysts as described in point 7 of Example 1.

The product is characterized in the same manner as previously described for surface area, pore distribution, X-ray species identity, crystallite size and catalytic activity. These data are presented in Table I and Table II.

The data indicates that reverse precipitation produces a very stable product. Furthermore, at least 75% of the pore volume is in the 200 to 400 Angstrom range compared to less than 50% for the comparative products shown in Examples 6, 7 and 8.

EXAMPLE 10

Characterization of the Undercoats

In this example, all of the preceding materials, the end products of Examples 1-9, were evaluated for surface area using a Micromeretics analyzer manufactured by Micromeretics Corporation of Waycross, Georgia. These surface area measurements were recorded in Table I and after heat treatment of 1000° C.

The preceding materials were also examined for total pore volume, pore distribution and for catalytic effectiveness. The data are reported in Table I.

In Example 1, particularly the preparation containing 20% $CeO_2$ and 80% $Al_2O_3$, the total pore volume was 0.210 ml/gram whereas the pore distribution was roughly 50-60% less than 200 Angstroms; 20-30% in the range 200-400 Angstroms and 10% greater than 400 Angstroms. This is a particularly preferred or optimum distribution of pores for an undercoat.

The activity of this composition even without precious metals is approximately 90% oxidation of CO and $C_3H_6$ at 300° C.

Example 9 prepared from the same ingredients by co-precipitation but with the reverse order of precipitant addition gave the following characterization data:

Approximately 0.40 ml/gram total pore volume after heat treatment at 350° C. only 0.15 ml/gram after heat treatment at 1000° C. After heat treatment at 1000° C., the distribution was 15% less then 200 Angstroms, 20% between 200 and 400 Angstroms and 65% greater then 400 Angstroms. This does not meet the most preferred characteristics of the invention, even though co-precipitated, but is better than any of the products of the prior art.

Example 6, 7 and 8 represent preparations of the prior art and each had total pore volume at least 23.8% below that of the 80% alumina/20% ceria results of Example 1. The pore distribution was sharply different with only about 15-25% being less then 200 Angstroms, roughly the same amount being 200-400 Angstroms. In all three instances, the total percentage of pores greater than 400 Angstroms exceeded the percentage of pores under 400 Angstroms. This is in stark contrast with the undercoat of the present invention. It will be noted also that the catalyst activity was only about 60% of that of the product of the present invention.

EXAMPLE 11

Additional samples of the aluminum oxide-cerium oxide were prepared and after calcining at 1000° C. for two hours, were examined by X-ray diffraction for crystallite size. The objective was to determine which composition resisted crystallization to the greatest extent. Minimizing crystal-lite growth is important to obtain greatest retention of inherent catalyst activity. The samples prepared were as follows:

A. A lot prepared as in Example 1 and with an $Al_2O_3$:$CeO_2$ ratio of 90:10.

B. A lot prepared as in Example 1 and with an $Al_2O_3$ to $CeO_2$ ratio of 80:20.

C. Mixed products of Example 1 comprising 1.5 part of 100% precipitated $Al_2O_3$ and 1 part of a 50:50 co-precipitate of cerium oxide and aluminum oxide milled together for 12 hours to obtain a homogeneous product. This product comprising a mixture of precipitated $Al_2O_3$ and a co-precipitated cerium carbonate and aluminum hydroxide with a $Al_2O_3$ to $CeO_2$ ratio of 80:20 was dried then calcined at 1000° C.

D. A mixture similar to 11-C except the 80:20 $Al_2O_3$:$CeO_2$ product was obtained by milling together separately precipitated $Al(OH)_3$ and $Ce(OH)_3$. This also was heated to 1000° C. and maintained at this temperature for 2 hours.

E. An additional 20:80 $CeO_2$:$Al_2O_3$ was obtained by milling together for 12 hours 3 parts precipitated aluminum oxide and 1 part of a 20:80 co-precipitated $Al_2O_3$:$CeO_2$. This was also calcined at 1000° C. for 2 hours.

F. An 80:20 $Al_2O_3$:$CeO_2$ mixed product was made by a procedure similar to that used as the undercoat (washcoat) of commerce. Sufficient cerium hydroxide of the type sold by Rhone-Poulenc Company and aluminum oxide designated Catapal sold by Vista Chemicals, Inc. was milled together for 12 hours to produce an 80:20 $Al_2O_3$ to $CeO_2$ mixture on final calcining. After milling the slurry was acidified with sufficient nitric acid to convert approximately 10% of the mixed oxides-hydroxides to nitrate. This product was also calcined at 1000° C.

The six samples and the product of Example 9 after calcining at 1000° C. were examined by X-ray spectrometer to determine stability (resistance to crystallite growth). The data were recorded in Table II.

The data in Table II indicates that Example 11-B is the most stable and most active. The stability is illustrated by the fact that after 1000° C. calcining the crystallite of both the $CeO_2$ and $Al_2O_3$ remain relatively low. Examples 11-C, 11-D and 11-E indicate that co-precipitation and subsequent mixing is inferior to 100% co-precipitation. Sample 11-F is the typical product of commerce and its catalytic inferiority is suggested by the excessive crystallite growth during 1000° C. calcining.

Table II describes a co-precipitated undercoat comprising alumina and cerium oxide which after calcining 1000° C. has ceria crystallites of a two theta angle at 32.9° which do not exceed 90 Angstroms in diameter and preferably do not exceed 75 Angstroms in diameter. Also described is a co-precipitated undercoat comprising alumina and lanthanum oxide which after calcining at 1000° C. had a lanthanum crystallite size that did not exceed 75 Angstroms in diameter.

TABLE I

| Alumina % | Lanthanide % | Heat Treat. | Surface Area m²/g | Total Pore Vol. ml/g | <200Å | >200 <400Å | >400Å | CO Oxd. at 300° C. | $C_3H_6$ Oxid. at 300° C. | $NO_x$ removal 300° C. Zero $O_2$ | Palladium Content | Crystallite Size Å |
|---|---|---|---|---|---|---|---|---|---|---|---|---|
| Example 1 | | | | | | | | | | | | |
| All soluble salts | | | | | | | | | | | | |
| 100 | 0 $CeO_x$ | 1000° C. | 69 | 0.163 | 0.10051 | 0.0449 | 0.0176 | | | | | 296 |
| 95 | 5 $CeO_x$ | 1000° C. | 77 | | | | | | | | | |
| 90 | 10 $CeO_x$ | 1000° C. | 62 | 0.132 | 0.0915 | 0.0281 | 0.0176 | 81.7% | 66.9% | 25.0% | 50 ppm | 142 |
| 80 | 20 $CeO_x$ | 1000° C. | 86 | 0.202 | 0.1231 | 0.058 | 0.0213 | 89.67% | 87.9% | 27.6% | 50 ppm | 190 |
| 65 | 35 $CeO_x$ | 1000° C. | 72 | 0.180 | 0.113 | 0.047 | 0.020 | | | | | |
| 50 | 50 $CeO_x$ | 1000° C. | 51 | 0.172 | 0.1397 | 0.0199 | 0.0123 | | | | | 218 |
| 35 | 65 $CeO_x$ | 1000° C. | 41 | 0.115 | 0.075 | 0.028 | 0.0121 | | | | | 218 |
| 0 | 100 $CeO_x$ | 1000° C. | 9 | 0.012 | 0.0075 | 0.0018 | 0.0029 | | | | | 553 |
| Example 2 | | | | | | | | | | | | |
| Soluble Salt | Soluble Salt | | | | | | | | | | | |
| 80 | $PrO_x$ 20 | 1000° C. | 82 | 0.28 | 0.15 | 0.073 | 0.057 | 87.3% | 89.4% | | 27.0% | 50 ppm 185 |
| Example 3 | | | | | | | | | | | | |
| Soluble Salt | Soluble Salt | | | | | | | | | | | |
| 80 | $NdO_x$ 20 | 1000° C. | 79 | 0.27 | 0.15 | 0.065 | 0.045 | 86.4% | 88.6% | | 31.6% | 50 ppm 169 |
| Example 4 | | | | | | | | | | | | |
| Soluble Salt | Soluble Salt | | | | | | | | | | | |
| 80 | $LaO_x$ 20 | 1000° C. | 81 | 0.28 | 0.16 | 0.065 | 0.55 | 84.1% | 84.5% | 28.4% | 50 ppm | 173 |
| Example 5 | | | | | | | | | | | | |
| Soluble Salt | Soluble Salt | | | | | | | | | | | |
| 80 | Mixed Lanthanides 20 | 1000° C. | 80 | 0.23 | 0.13 | 0.05 | 0.05 | 89.8% | 89.2% | 30.5% | 50 ppm | 183 |
| Example 6 | | | | | | | | | | | | |
| Soluble Salt | Solid | | | | | | | | | | | |
| 80 | Ce(OH)₄ 20 | 1000° C. | 64 | 0.16 | 0.03 | 0.03 | 0.10 | 68.2% | 63.4% | 10.4% | 50 ppm | 206 |
| Example 7 | | | | | | | | | | | | |
| Soluble Salt | Solid | | | | | | | | | | | |
| 80 | Ce(OH)₄ 20 | 1000° C. | 67 | 0.15 | 0.04 | 0.03 | 0.08 | 59.4% | 64.4% | 12.6% | 50 ppm | 201 |
| Example 8 | | | | | | | | | | | | |
| Solid | Soluble Salt | | | | | | | | | | | |
| Al(OH)₃ 80 | 20 | 1000° C. | 58 | 0.13 | 0.02 | 0.04 | 0.07 | 51.0% | 39.4% | 11.9% | 50 ppm | 196 |
| Example 9 | | | | | | | | | | | | |
| Soluble Salt | Soluble Salt | | | | | | | | | | | |
| 80 | 20 | 1000° C. | | 0.15 | 0.02 | 0.03 | 0.10 | 85.7% | 86.2% | 16.6% | 50 ppm | |

TABLE II

| Example | Heat Treatment Temperature | Prepared By | Al₂O₃:CeO₂ | Crystallite Size | | Ceria 2 Theta 32.9 Crystallite Size |
|---|---|---|---|---|---|---|
| | | | | CeO₂ | Al₂O₃ | |
| 11-A | 1000° C. | Co-prec | 90:10 | 1024 | 570 | 58.4 |
| 11-B | 1000° C. | Co-prec | 80:20 | 1222 | 304 | 60.19 |
| 11-C | 1000° C. | Co-prec + Mix | 80:20 | 1892 | 786 | 80.71 |
| 11-D | 1000° C. | Co-prec + Mix | 80:20 | 1560 | 777 | 138.0 |
| 11-E | 1000° C. | Co-prec + Mix | 80:20 | 2221 | 469 | 79.4 |
| 11-F | 1000° C. | Purchase Mix | 80:20 | 2345 | 309 | 107.45 |
| 9 | 1000° C. | Reverse Co-prec | 80:20 | 1289 | 353 | 66.08 |

While the invention has been described in terms of various preferred embodiments, those skilled in the art will appreciate that various modifications, substitutions, omissions, and changes may be made without departing from the spirit thereof. Accordingly, it is intended that the scope of the present invention be limited solely by the scope of the following claims.

What is claimed is:

1. A method of oxidizing or reducing gases comprising contacting said gases at an elevated temperature of about 100° C. to about 1300° C. with a catalyst support material comprising a plurality of stable, highly porous, co-precipitated microcrystallite particulates consisting essentially of an integral admixture of alumina and at least one lanthanide oxide, wherein said lanthanide oxide comprises at least 1% cerium oxide, and wherein about 20 to 30% of the pores have a pore diameter within the range of about 200 to 400 Angstroms.

2. The method as claimed in claim 1 wherein said gases are present in internal combustion engine exhaust.

3. The method as claimed in claim 2 wherein said gases are carbon monoxide and hydrocarbons.

4. The method as claimed in claim 1 wherein said catalyst support material has an active catalyst deposited thereon.

5. The method as claimed in claim 1 wherein about 50 to 60% of the pores on the catalyst support material have a pore diameter of less than 200 Angstroms.

6. The method as claimed in claim 1 wherein the lanthanide oxide is an oxide of cerium and at least one member of the group consisting of lanthanum, praseodymium, neodymium or mixture thereof.

7. The method as claimed in claim 1 wherein the amount of alumina is from about 1 to about 75 weight percent of the entire solids content of the catalyst support material.

8. The method as claimed in claim 7 wherein the lanthanide oxide is present in an amount of from about 1 to about 45 weight percent based on the weight of the alumina in the catalyst support material.

9. The method as claimed in claim 1 wherein said catalyst support material further comprises a film forming material.

10. The method as claimed in claim 1 wherein said catalyst support material is provided as a coating on a support.

11. A method of oxidizing or reducing gases comprising contacting said gases at an elevated temperature of about 100° C. to about 1300° C. with a catalyst support material comprising a plurality of stable, highly porous, co-precipitated microcrystallite particulates consisting essentially of an integral admixture of alumina and at least one lanthanide oxide, wherein said lanthanide oxide comprises at least 1% cerium oxide, and wherein said average pore volume after calcination is in the range of about 0.15 cc/g to about 0.5 cc/g.

12. The method as claimed in claim 11 wherein said gases are present in internal combustion engine exhaust.

13. The method as claimed in claim 12 wherein said gases are carbon monoxide and hydrocarbons.

14. The method as claimed in claim 11 wherein said catalyst support material has an active catalyst deposited thereon.

15. The method as claimed in claim 11 wherein about 50 to 60% of the pores on the catalyst support material have a pore diameter of less than 200 Angstroms.

16. The method as claimed in claim 11 wherein the lanthanide oxide is an oxide of cerium and at least one member of the group consisting of lanthanum, praseodymium, neodymium or mixture thereof.

17. The method as claimed in claim 11 wherein the amount of alumina is from about 1 to about 75 weight percent of the entire solids content of the catalyst support material.

18. The method as claimed in claim 17 wherein the lanthanide oxide is present in an amount of from about 1 to about 45 weight percent based on the weight of the alumina in the catalyst support material.

19. The method as claimed in claim 11 wherein said catalyst support material further comprises a film forming material.

20. The method as claimed in claim 11 wherein said catalyst support material is provided as a coating on a support.

* * * * *